March 3, 1953  W. STEIN  2,630,049
COMBINED EXPOSURE METER AND CAMERA
Filed Jan. 17, 1951
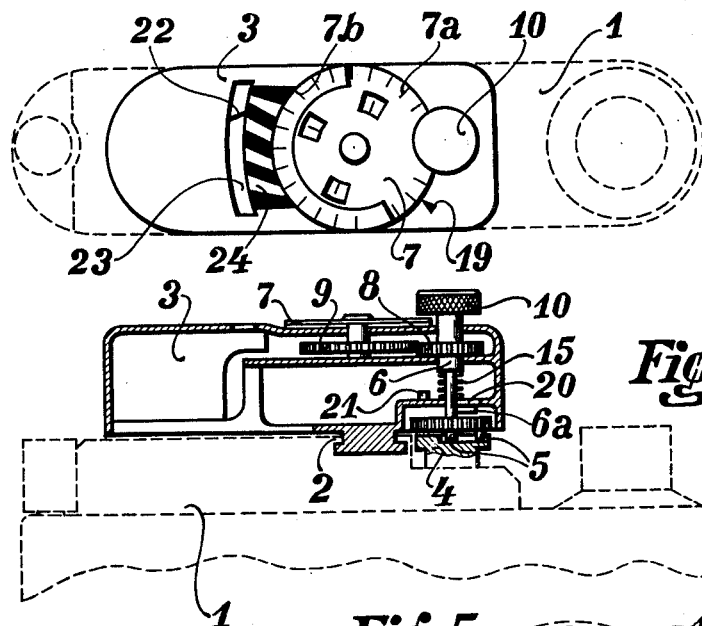
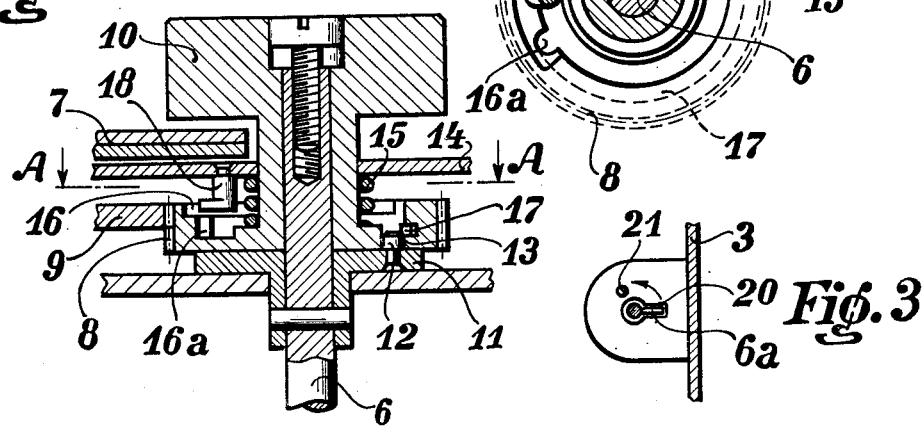
WILHELM STEIN INVENTOR.
BY Juan E. A. Königsberg
atty.

Patented Mar. 3, 1953

2,630,049

UNITED STATES PATENT OFFICE 2,630,049

COMBINED EXPOSURE METER AND CAMERA

Wilhelm Stein, Wetzlar-on-the-Lahn, Germany, assignor to Ernst Leitz, G. m. b. H., Wetzlar, Germany, a corporation of Germany Application January 17, 1951, Serial No. 206,340
In Germany February 13, 1950

4 Claims. (Cl. 95—10)

This invention relates to improvements in electric photographic exposure meters of the type which is adapted to be attached to a photographic camera. The object of the invention is to provide a novel and improved coupling mechanism for operatively connecting the exposure meter to the camera so arranged that the coupling members are mounted upon the exposure meter operating spindle and adapted to be connected to and disconnected from the camera timing shaft. The advantage of such an arrangement is that it is thereby possible to utilize the entire range of exposure measurements of the meter, whereas, if an ordinary exposure meter is coupled directly with the camera timing shaft, exposure values beyond the range of adjustment of the timing mechanism of the camera could not be measured by the exposure meter because the latter has a far greater range of exposure measurement values than has the camera. All exposures of greater length than one second, for example, could not be ascertained if an ordinary exposure meter were connected with the camera timing shaft. For exposures of greater length it would be necessary to detach the exposure meter and use it separately.

Electric exposure meters have been proposed for attachment to a camera with the coupling mechanism mounted upon an electric adjusting element which influences the electric circuit of the meter. Such an arrangement had the disadvantage that the attached exposure meter could be used only for a limited range of measurements corresponding to the range of adjustability of the camera timing means. Beyond that range the meter could not be used while attached to the camera. This would be particularly troublesome when longer exposures were involved, for example, exposures longer than one second.

The invention is embodied in an exposure meter having an operating spindle which carries the coupling members for connection with the camera timing shaft, the parts being so arranged that within a given range of exposures, rotation of the spindle in turn causes rotation of the timing shaft to set the camera timing means. When, however, this range is exhausted, the spindle may be disconnected from the camera shaft for exposures of greater length without losing its operative connection with the exposure meter control dial or setting means. A modification is included in which the coupling members are carried by the knob for rotating the camera shaft.

The details of construction and operation of the exposure meter according to this invention will best be understood from the folowing specification read together with the accompanying drawing in which Fig. 1 is a plan view of an exposure meter embodying the invention showing the meter attached to a camera.

Fig. 2 is a longitudinal sectional view through the exposure meter and parts of the camera.

Fig. 3 is a plan view of a detail shown in Fig. 2.

Fig. 4 is a longitudinal sectional view, on a larger scale, showing the modified coupling arrangement between the exposure meter spindle and the camera timing shaft.

Fig. 5 is a plan view, partly in section, on the line A—A of Fig. 4.

In the drawing, an exposure meter 3 is detachably mounted upon a camera 1 by means of a slide 2 whereby the camera exposure time shaft, hereinafter called the timing shaft 4 automatically engages coupling members 5 carried by the meter shaft or spindle 6 which is rotated to adjust or set the exposure meter control dial 7. The operating connection between the spindle 6 and the dial 7 is effected by means of two gears 8 and 9. The spindle 6 carries an operating knob 10. The spindle is axially displaceable against the force of a spring 15. During such displacement the gears 8 and 9 remain in mesh so that continued rotation of the spindle after such uncoupling will cause rotation of the dial 7. The angular range of rotation in one direction of the axially displaced spindle 6 is defined by the usual B-speed position within the camera. In the other direction the angular range of the spindle is limited by a stop 21 on the meter housing. This stop 21 also limits the exposure range movement of the exposure meter.

The spindle 6 carries a finger 6a which normally prevents axial displacement of the spindle. The meter housing is provided with a slot 20. When the timing shaft 4 has been rotated to the limit of adjustment to the B-speed position, the finger 6a will be in alinement with the slot 20. The operator may then lift the spindle against the force of the spring 15 to uncouple the spindle from the shaft 4. The spindle, however, remains in operative engagement with the meter mechanism through the gearing 8, 9, the gear 8 being longer than the gear 9. The spindle may then be further rotated until the finger 6a strikes the stop 21. The angular range of rotation of the spindle corresponds to the measuring range of the exposure meter 3.

Figs. 4 and 5 illustrate a modification in which the spindle 6 is not axially displaceable but remains coupled to the time shaft 4 in the manner explained above. Instead, the spindle operating knob 10 is axially displaceable to uncouple the meter from the spindle 6. The latter carries a coupling disk 11 with an eccentrically disposed upstanding pin 12 which normally extends into a hole 13 in the gear 8. The latter is normally coupled to the disk 11 by a spring 15 as shown.

The gear 8 has an upper annular recess extending for about 180 degrees and a lower annular recess 17 also extending about 180 degrees. The two recesses overlap at one end and are diametrically opposite each other as shown in Fig. 5. The housing wall 14 carries a fixed stop 18 adapted to extend into both recesses. The knob 10 may therefore be rotated about 180 degrees until the overlapping end of the upper recess 16 abuts the stop 18. During this rotation the gear 8 remains in mesh with the gear 9 and also coupled to the disk 11. In order to rotate the gear 8 still further and thereby continue the operation of the exposure meter dial 7, the knob 10 and with it the gear 8 is lifted against the force of the spring 15 to uncouple the knob from the spindle 6. Through a notch 16a in the lower recess the fixed stop 18 enters the recess 17 and thus limits the further rotation of the knob to correspond with the measuring range of the exposure meter.

The exposure meter is provided with the usual meter setting means or control dial 7 which comprises two relatively oppositely adjustable scale carriers 7a and 7b. A moving coil galvanometer actuated a pointer 22 which is visible through a window 23 opposite the light scale 24. The scale 7a is graduated in exposure time values which also may be read with reference to a fixed mark 19. The scale 7b is graduated in stop values.

The use of the exposure meter when attached to a camera is as follows. The meter is directed towards the object to be photographed. The stop of the lens system of the camera is suitably set and the corresponding stop value on the scale of the dial 7 is brought into register with the indicator of the meter by rotation of the knob 10. Thereby the resulting exposure time value is transferred to the camera timing shaft 4 via the coupling means 5 for setting the shaft 4 to exposure time. One of the two ranges of rotation of the knob 10 coincides with the range within which the exposure time may be set by the camera. If, owing to light conditions, this range is exceeded, the stop value on the scale of the exposure meter may be brought into register with the indicator only after the knob 10 has been axially displaced, either together with the spindle 6 and the gear 8 as in Figs. 2 and 3, or together with the gear 8 only as in Figs. 4 and 5. Owing to the displacement, the setting means or control dial 7 of the exposure meter is disconnected from the timing shaft 4 of the camera so that after the displacement the indications of the exposure meter are no longer transferred to the timing shaft on the camera. Such indications—B-speeds—must be read off against the index mark 19 and must be taken into account by counting during bulb exposures or by manual transfer to an additional device on the camera for setting exposure time. The additional device is not shown but is known to camera users as the dial for long exposures.

The disclosed embodiment of the invention is susceptible of modifications. For example, the electric exposure meter may be replaced by an optical or optic-electrical meter. An exposure meter according to the invention may be used with many camera types which allow continuous setting of the exposure time by means of a setting knob or the like member which remains stationary during movement of the shutter. The exposure meter of the invention may, of course, also be used in the usual manner while not attached to a camera.

I claim:

1. In combination, a photographic camera and an exposure meter detachably mounted thereon, exposure setting means in said meter, an exposure timing shaft in said camera, an axially movable and rotatable hand knob movably supported to occupy two different axial positions, gears connecting said knob with said meter setting means for operating the latter in either of the two axial positions of the knob, means releasably connecting said knob with said timing shaft to rotate the latter when the knob is in its one axial position and for disconnecting said shaft from the knob when the latter is moved into its other axial position, cooperating means in said camera and in said knob preventing axial displacement of the knob while it is rotated in its one axial position to operate the said camera timing shaft together with said meter setting means within a given range of exposures indicated by said meter and providing for axial displacement of said knob at the end of said given range and preventing axial displacement of said knob while it is rotated in its other axial position after its disconnection from the camera timing shaft to operate said exposure setting means beyond the said given range of exposures.

2. The combination according to claim 1 in which the said releasable connecting means comprise coupling members on said hand knob and on said camera timing shaft and a spring for releasably maintaining coupling connection between said members.

3. The combination according to claim 1 in which the said cooperating means on the hand knob and in the camera consists in two axially spaced diametrically oppositely positioned semicircular overlapping recesses in said knob having overlapping ends with a single communicating passage therebetween at said overlapping ends and a fixed abutment in the camera adapted to engage said recesses, one after the other at the overlapping ends thereof, said recesses, respectively, limiting the rotations of said knob through the given ranges of exposures, respectively, indicated by the exposure meter.

4. In combination, a photographic camera and an exposure meter detachably mounted thereon, exposure setting means in said meter, an exposure timing shaft in said camera, an axially movable and rotatable hand knob having a lower normal position for simultaneously rotating said camera shaft and said meter setting means, and an upper axial position for rotating said meter setting means alone, means for releasably connecting said knob in its lower position with the camera shaft and for automatically operatively disconnecting said knob from said shaft when the knob is moved into its said upper position, gears connecting said meter setting means with said timing knob for rotating the setting means whenever the knob is rotated, means in said camera and in said hand knob for preventing axial displacement of the knob and limiting its rotation and that of the camera shaft when the knob is rotated in response to a range of exposures corresponding to the speed range of the camera and for limiting the rotation of the hand knob for a greater range of exposures and preventing axial displacement of the knob during such further rotation, said last named means comprising two diametrically opposite overlapping semicircular recesses in said hand knob in axial stepped relation therein with a single communicating passage between said recesses at their overlapping ends, a fixed abutment in the camera engaging one of said recesses to limit rotation of said camera shaft and said hand knob together within one given range of exposures and thereafter engaging the other recess to limit the rotation of the hand knob alone within a further given range of exposures, said abutment preventing axial displacement of the hand knob while the abutment engages said recesses except at the communicating passage at overlapping ends thereof.

WILHELM STEIN.

REFERENCES CITED

The following references are of record in the file of this patent:

UNITED STATES PATENTS

| Number | Name | Date |
|---|---|---|
| 2,222,292 | Gorlich | Nov. 19, 1940 |
| 2,241,020 | Nerwin | May 6, 1941 |
| 2,343,206 | Rath | Feb. 29, 1944 |

FOREIGN PATENTS

| Number | Country | Date |
|---|---|---|
| 727,130 | Germany | Oct. 26, 1942 |